No. 862,788. PATENTED AUG. 6, 1907.
W. H. BALCH.
WHEEL BRAKE.
APPLICATION FILED JAN. 3, 1907.
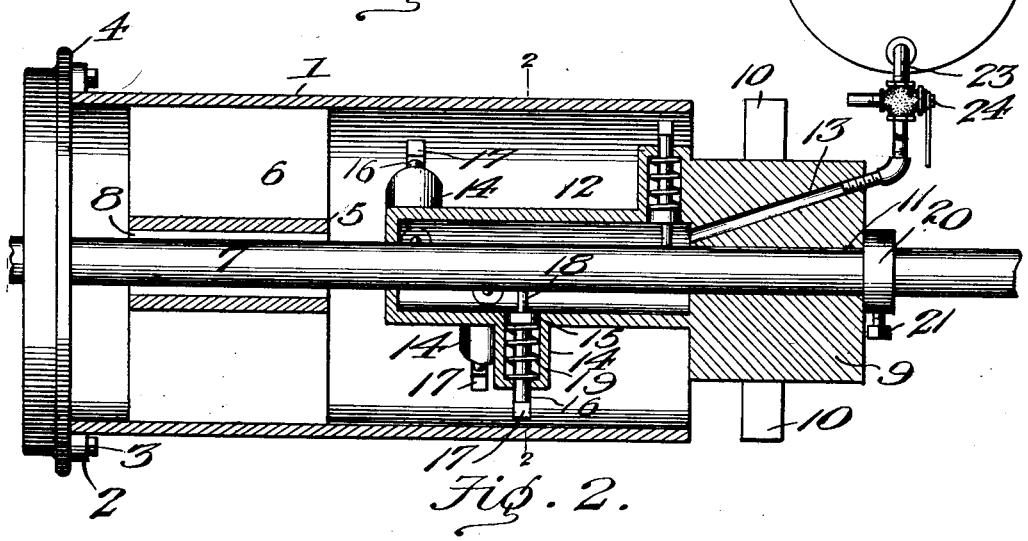
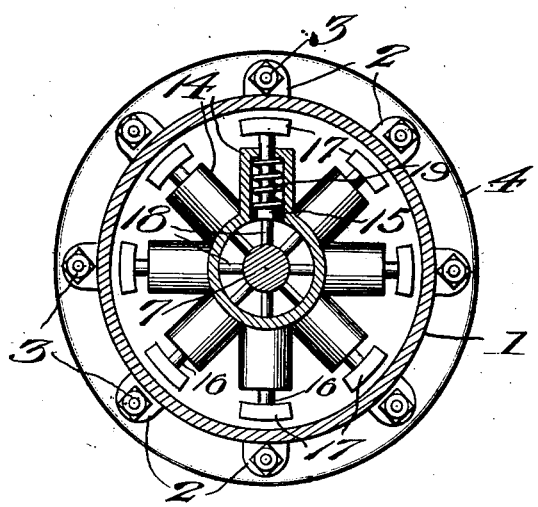
Inventor
William H. Balch
Witnesses
Frank B. Hoffman
D. W. Gould.
By Victor J. Evans
Attorney

UNITED STATES PATENT OFFICE.

WILLIAM H. BALCH, OF PHILADELPHIA, PENNSYLVANIA.

WHEEL-BRAKE.

No. 862,788.    Specification of Letters Patent.    Patented Aug. 6, 1907.

Application filed January 3, 1907. Serial No. 350,601.

*To all whom it may concern:*

Be it known that I, WILLIAM H. BALCH, a citizen of the United States, residing at Philadelphia, in the county of Philadelphia and State of Pennsylvania, have invented new and useful Improvements in Wheel-Brakes, of which the following is a specification.

The invention relates generally to an improvement in wheel brakes designed particularly for use on passenger carrying vehicles, and particularly to a brake arranged for direct operation by a motive fluid.

The main object of the invention is the provision of a braking mechanism in which a series of shoes are operated through the medium of compressed air to impinge an auxiliary braking surface fixed to and movable with the wheel.

The invention in the preferred form of details will be described in the following specification, reference being had particularly to the accompanying drawing, in which:

Figure 1 is a longitudinal central section through a braking mechanism constructed in accordance with my invention. Fig. 2 is a transverse section of the same on line 2—2 of Fig. 1.

Referring particularly to the drawings, wherein is illustrated the preferred embodiment of the present invention, 1 represents a braking cylinder formed at the outer or remote end with a series of radially and laterally extended ears 2, designed to be secured through the medium of bolts 3 to the relatively inner surface of the wheel flange 4. The cylinder is exteriorly of somewhat less diameter than that of the wheel, being arranged concentrically with the periphery of the wheel, and, through the medium of the connection described, forming for the purposes of the present invention, a fixed part of the track wheel.

Adjacent the remote or outer end the cylinder is provided with a fixed hub 5 connected with the cylinder through a series of radial spokes 6, preferably in the from of elongated plates, the hub being keyed or otherwise secured to the axle 7, as at 8, thus further reinforcing the braking cylinder and insuring the rotation of the latter with the axle.

Adjacent the inner open end of the cylinder, I provide a head block 9, of substantial size, which through the medium of braces 10 is immovably secured to any fixed part of the car frame or structure. The block 9 is formed with a central opening 11 for the passage of the axle 7, and is integrally provided at its relatively outer end with a power cylinder 12. The cylinder 12 is of materially less diameter than the braking cylinder being closed at its relatively outer end and concentrically disposed with and supported upon the axle 7. The head block is so arranged that the cylinder 12 is disposed wholly within the braking cylinder, and said block is formed with a port or channel 13 extending through the block and communicating at the relatively outer end with the interior of the power cylinder.

The wall of the power cylinder is formed throughout its length with a series of radially projecting casings 14, in open communication at the inner ends with the interior of the cylinder. The casings 14 hereinafter termed the piston cylinders, project radially from the wall of the power cylinder in respectively offset planes circumferentially of the cylinder, that is, the series of piston cylinders are in alinement circumferentially and spirally of the power cylinder. By this arrangement the piston cylinders cover practically the entire circumferential area of the power cylinder, whereby to provide a most effective braking operation, as will presently appear.

Within each piston cylinder is secured a piston 15 snugly fitting the interior thereof and carrying an outwardly projecting stem 16 projecting through the head of the cylinder, and provided beyond said head with a brake shoe 17, the operative surface of which is elongated in a plane transverse the plane of the braking cylinder and is preferably curved to correspond to the interior curvature of said cylinder. The piston 15 is also provided with an inwardly projecting pin 18, designed to limit the inward movement of the piston, and therefore of a length equal to the distance from the interoir surface of the power cylinder to the surface of the axle 7. By this construction the inward movement of the piston under the influence of a spring 19 coiled about the stems 16 between the piston 15 and the head of the piston cylinder, is limited by contact with the pin 18 with the axle, in which position the relatively inner surface of the piston 15 will be approximately in a plane with the inner surface of the power cylinder.

A collar 20 is arranged to encircle the axle 7 and be secured thereto through the medium of a set screw 21, said collar bearing against the relatively inner surface of the head block 9 and serving to maintain said block in determinate position relative to the axle.

Power is supplied to the braking mechanism from tank 22 secured to any fixed part of the car frame, and adapted to contain air under pressure, said tank being in communication with the duct 13 in the head block to a pipe 23 provided with a manually controlled valve 24, said pipe being of course, so arranged as to dispose the valve 24 within convenient reach of the operator desiring to control the brakes.

In use the motive fluid in the tank 22, at the will of the operator, through manipulation of the valve 24, is admitted to the power cylinder 12, thereby forcing the pistons 15 upwardly and causing the shoes 17 to engage the relatively inner surface of the braking cylinder 1. As the braking cylinder is in effect a part of the wheel, the operation described tends to retard the travel of the cylinder and thereby brake the wheel. The power from the tank 22 may be admitted with the degree of force deemed necessary by the operator, and hence the braking operation may be gradual or sudden, as the exigencies of the particular occasion may demand.

The use of the independent braking pistons is important as it provides for a braking action, notwithstanding one or more of said cylinders may be inoperative. Furthermore, the particular arrangement of the piston cylinders insures an extended braking influence on the cylinder which, by the arrangement described, is materially greater than is possible through the application of such braking influence to the tread of the wheel proper.

The use of the braking cylinder, which may be a single integral body, or made up in sections as preferred, is desirable, as it permits a proper braking of the mechanism without in anyway influencing the wheel surface. Flattening of the wheel is thereby avoided, and the life of the wheel for its usual purposes, materially increased, it being particularly noted that the braking cylinder, and the brake shoes are the only parts subjected to wear, and that these parts form no portion of the permanent car structure, and may be readily and conveniently removed when desired.

While showing and describing the braking mechanism as applied to one axle of a vehicle, it is obvious that such mechanism may be as conveniently applied to all the axles and the surface pipe 23 branched beyond the valve 24 to permit a braking action on all the wheels through a single operation of the valve 24.

The details of construction shown and described constitute the preferred embodiment of the present invention though it is to be understood that all changes and variations that may fall within the scope of the appended claims are contemplated as within the spirit of the present invention.

Having thus described the invention, what I claim is:

1. A braking mechanism comprising a braking cylinder designed to be secured to a vehicle wheel, and means for exerting a braking pressure in a spiral line against the interior surface of said cylinder.

2. A braking apparatus comprising a braking cylinder secured to a vehicle wheel, a power cylinder arranged within the braking cylinder, and brake shoes carried by the power cylinder and adapted to engage the braking cylinder, said shoes being operated under power admitted to the power cylinder.

3. A braking mechanism comprising a braking cylinder secured to a vehicle wheel, a power cylinder arranged within the braking cylinder, means for admitting power to the power cylinder, and a series of brake shoes carried by the power cylinder and operated by the power admitted thereto to engage the inner surface of the braking cylinder, said shoes being arranged in alinement spirally and concentrically of the power cylinder.

4. A braking mechanism comprising a braking cylinder secured to a vehicle wheel, a power cylinder arranged within the braking cylinder, means for admitting power to the power cylinder, a piston cylinder in open communication with the braking cylinder, a piston within said cylinder, a stem projecting from the piston, and a brake shoe carried by the stem.

5. A braking mechanism comprising a braking cylinder secured to the vehicle wheel and to the axle on which said wheel is mounted, a power cylinder arranged within the braking cylinder and encircling the axle of the vehicle, a brake shoe operated by power admitted to the power cylinder, a piston connected with the shoe, and means for limiting the inactive movement of the piston.

6. A braking mechanism comprising a braking cylinder movable with the vehicle wheel, a power cylinder arranged within the braking cylinder and encircling the axle on which the wheel is mounted, means for admitting power to the power cylinder, a piston operated by the power admitted to the power cylinder, a brake shoe carried by the piston, and a pin projecting from the piston and adapted to engage the axle to limit the inward movement of the piston.

7. A braking mechanism comprising a braking cylinder movable with the braking wheel and axle, a head block encircling the axle and fixed with relation to the vehicle frame, said head block being formed with a channel, a power cylinder carried by the head block and disposed within the braking cylinder, a pressure tank in communication with the port in the head block, a series of pistons mounted in the power cylinder and operable in one direction to power admitted thereto, brake shoes carried by the pistons and arranged to engage the inner surface of the braking cylinder, means for moving the pistons to normal or inoperative position, and means carried by each piston for limiting said movement.

In testimony whereof, I affix my signature in presence of two witnesses.

WILLIAM H. BALCH.

Witnesses:
WM. POWERS,
GEO. J. HELLER.